US006921585B2

(12) United States Patent
Sexton

(10) Patent No.: US 6,921,585 B2
(45) Date of Patent: Jul. 26, 2005

(54) PERPENDICULAR MAGNETIC RECORDING MEDIA WITH AN AMORPHOUS UNDERLAYER

(75) Inventor: Joseph H. Sexton, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 470 days.

(21) Appl. No.: 10/146,269

(22) Filed: May 15, 2002

(65) Prior Publication Data

US 2003/0214741 A1 Nov. 20, 2003

(51) Int. Cl.[7] .............................................. G11B 5/673
(52) U.S. Cl. ...................... 428/669; 428/678; 428/216; 428/694 TS; 428/694 TM
(58) Field of Search ................. 428/669, 678, 428/216, 694 TS, 694 TM

(56) References Cited

U.S. PATENT DOCUMENTS

| | | | |
|---|---|---|---|
| 5,400,307 A | | 3/1995 | Ochiai et al. |
| 5,563,000 A | | 10/1996 | Hatwar et al. |
| 5,660,930 A | * | 8/1997 | Bertero et al. ............... 428/332 |
| 5,693,200 A | | 12/1997 | Tyan et al. |
| 5,723,032 A | * | 3/1998 | Yamaguchi et al. ..... 204/192.2 |
| 5,731,070 A | | 3/1998 | Endo et al. |
| 5,750,270 A | * | 5/1998 | Tang et al. .................. 428/611 |
| 5,837,386 A | | 11/1998 | Miller et al. |
| 5,846,648 A | * | 12/1998 | Chen et al. .................. 428/332 |
| 5,851,363 A | | 12/1998 | Miller et al. |
| 5,851,643 A | * | 12/1998 | Honda et al. ................ 428/212 |
| 6,183,893 B1 | | 2/2001 | Futamoto et al. |
| 6,248,416 B1 | | 6/2001 | Lambeth et al. |
| 6,753,072 B1 | * | 6/2004 | Chen et al. .................. 428/216 |
| 2001/0033949 A1 | | 10/2001 | Abarra et al. |
| 2003/0091868 A1 | * | 5/2003 | Shimizu et al. ...... 428/694 TM |

FOREIGN PATENT DOCUMENTS

| | | | |
|---|---|---|---|
| GB | 2 302 980 | | 2/1997 |
| JP | 05-189824 | | 7/1993 |
| JP | 6-251441 | | 9/1994 |
| JP | 06/251441 A | * | 9/1994 |
| JP | 2001-176057 | | 6/2001 |

OTHER PUBLICATIONS

Machine Translation of JP 06–251441–A.*
Radnoczi et al., "Growth Structure of Thin Films for Perpendicular Magnetic Recording Media," Cryst. Res. Technol. 35, pp. 707–711, (2000) 6–7.
Gong et al., "Intergranular Coupling and Grain Isolation of Thin Co Films," Mat. Rec. Soc. Symp. Proc., vol. 517, 223 (1998).
Ohmori et al., "Magnetic properties and noise characteristics of Co/Pd multilayer perpendicular magnetic recording media," Journal of Magnetism and Magnetic Materials, 235, pp. 45–52 (2001).
Sato et al., "Co–Cr–Ta Perpendicular Magnetic Recording Media Using Pt Seed Layer," IEEE Transactions on Magnetics, vol. 36, No. 5, pp. 2387–2389 (2000).
Gong et al., "Highly oriented perpendicular Co–alloy media on Si(111) substrates," Journal of Applied Physics, vol. 85, No. 8, pp. 4699–4701 (1999).

(Continued)

Primary Examiner—Kevin M. Bernatz
(74) Attorney, Agent, or Firm—Eric D. Levinson

(57) ABSTRACT

Perpendicular magnetic media are described for use in magnetic recording and data storage. For example, a magnetic medium may include a substrate, an amorphous underlayer formed over the substrate, a seed layer formed over the amorphous underlayer, and a multi-layered magnetic stack formed over the seed layer. In this manner, high perpendicular magnetic anisotropy can be achieved and storage densities can be increased.

27 Claims, 12 Drawing Sheets

OTHER PUBLICATIONS

Roy et al., "Seed–layer effect on the microstructure and magnetic properties of Co/Pd multilayers," Journal of Applied Physics, vol. 89, No. 11, pp. 7531–7533 (2001).

Onoue et al., "CoCrPtTa and Co/Pd Perpendicular Magnetic Recording Media with Amorphous Underlayers," IEEE Transactions on Magnetics, vol. 37, No. 4, pp. 1592–1594 (2001).

Peng et al., "Co/Pd and Co/Pt Multilayers with Indium Tin Oxide Seed Layers and NiFe Soft Underlayers for Perpendicular Magnetic Recording Media," IEEE Transactions on Magnetics, vol. 37, No. 4, pp. 1577–1579 (2001).

Ohmori et al., "Low Noise Co/Pd Multilayer Perpendicular Media with Granular Seed Layer," IEEE Transactions on Magnetics, vol. 36, No. 5, pp. 2384–2386 (2000).

Onoue et al., "Improvement of signal to noise ration for Co/Pd multilayer perpendicular magnetic recording media by the addition of an underlayer," Journal of Magnetism and Magnetic Materials, 235, pp 40–44 (2001).

Osaka et al., "Proposal of Novel Cobalt–Palladium Media Controlled with C or Si Underlayer for Ultra High Density Magnetic Recording," Waseda University, 3–4–1, Okubo, Shinjuku–ku, Tokyo 169–8555 Japan.

Gong, "Development of Highly Oriented Media Structures for Perpendicular Recording," Thesis submitted to the Department of Electrical and Computer Engineering, Carnegie Mellon University, Pittsburgh, Pennsylvania, Sep., 2000.

* cited by examiner

PERPENDICULAR MAGNETIC RECORDING MEDIA WITH AN AMORPHOUS UNDERLAYER

This invention was made with Government support under Agreement No. 70NANB1H3022 with the National Institute of Science end Technology (NIST) Advanced Technology Program (ATP). The Government has certain rights in this invention.

TECHNICAL FIELD

The invention relates to data storage media and, more particularly, perpendicular magnetic media.

BACKGROUND

Many types of magnetic data storage media have been developed to store information. They include magnetic hard drives, magnetic diskettes, magnetic tapes, magnetic tape cartridges, hybrid magnetic media such as magnetic-optical disks, and the like. Increasing data storage density is a paramount goal in the development of new or improved types of magnetic data storage media. Cost reduction is another goal.

Magnetic media generally function according to ferromagnetic principles. For example, the surface of a magnetic medium may be coated with one or more magnetic layers, e.g., in the form of a multi-layered magnetic stack or a magnetic alloy. The local magnetization of magnetic domains defined on the magnetic layers can be selectively oriented to encode data. The local magnetizations can then be detected and interpreted in order to read the recorded data. A hysteresis curve typically defines how the magnetic domains can be oriented or reoriented in response to application and removal of magnetic fields.

A number of techniques have been developed to increase storage densities and improve quality and reliability of magnetic media. For example, new and improved coatings have been developed over the years in an effort to improve quality and performance of magnetic media. Also, seed layers have been developed to enhance the quality and performance of the subsequently deposited magnetic layers. A seed layer refers to a layer of a magnetic medium that can control or define the crystal texture of subsequently deposited layers. For example, a seed layer may help define the crystal phase, and the crystalline orientations of subsequently deposited layers, and may improve the magnetic properties of subsequently deposited layers.

Magnetic media can be categorized as longitudinal or perpendicular. Most conventional magnetic media are longitudinal. In longitudinal media, magnetic anisotropy lies parallel to the plane of the medium. In other words, in longitudinal media, the magnetic orientation of individual magnetic domains is generally parallel to the surface of the medium.

In perpendicular media, on the other hand, magnetic anisotropy is perpendicular to the plane of the medium. In other words, in perpendicular media, the magnetic orientation of individual magnetic domains is perpendicular to the medium surface. Perpendicular media generally allow for a much higher storage density than can be achieved in longitudinal media. Perpendicular magnetic properties adequate for high density recording are currently achievable with only a limited number of materials.

SUMMARY

In general, the invention is directed to perpendicular magnetic media for use in magnetic recording and data storage. For example, a magnetic medium may include a substrate, an amorphous underlayer formed over the substrate, a seed layer formed over the amorphous underlayer, and a multi-layered magnetic stack formed over the seed layer. The individual layers that define the multi-layered stack may each have thicknesses less than approximately three nanometers.

As described in greater detail below, an amorphous underlayer can allow the subsequently deposited seed layer to grow with a crystalline texture which in turn promotes perpendicular magnetic anisotropy in the subsequently deposited magnetic layer. In other words, the use of an appropriate amorphous material as an underlayer can minimize the chemical, electrical, and microstructural effects that occur between the seed layer and the underlayer during deposition. Therefore, the seed layer can naturally assume a crystalline texture of face centered cubic crystallites in a (111) orientation, with minimal influence from the underlayer. The seed layer, in turn, improves the crystal texture of the multi-layered magnetic stack. In other words, the seed layer interacts with the subsequently deposited multi-layered magnetic stack to cause the crystallizes of the multi-layered magnetic stack to also take on a face centered cubic phase in a (111) orientation. In this manner, high perpendicular magnetic anisotropy can be more readily achieved and storage densities can be increased.

The substrate may comprise glass, plastic, organic resin, metal, or any other suitable substrate material. The described structures and compositions may be particularly advantageous when plastic substrates are used because high temperatures may not be required for their creation, unlike many conventional media. Accordingly, the invention may reduce the costs of media manufacture by avoiding high temperature processing and facilitating the use of plastic substrates. Media may also be fabricated more quickly when high temperature processing is avoided. Advantageous thickness ranges for the amorphous underlayer and the seed layer are also described. As outlined in greater detail below, the desirable thickness ranges may be slightly different for different substrate materials.

The amorphous underlayer may comprise carbon, boron, silicon carbide, or chromium. In addition, the amorphous underlayer may define a thickness of less than approximately 100 nanometers. In many cases, carbon can be used for the amorphous underlayer. In some cases, the carbon layer may define a thickness of less than approximately 40 nanometers. The use of carbon results in a high interface energy between the carbon and the seed layer which results in improved mobility of the seed layer atoms, i.e., adatoms, as they condense on the underlayer surface. By using a relatively thin layer of carbon, the smoothness, density and amorphous nature of the underlayer can be further improved.

The seed layer may comprise platinum or, in some embodiments, a platinum alloy. The seed layer may define a thickness between approximately 1 and 50 nanometers, or more specifically between approximately 2.5 and 25 nanometers.

The multi-layered magnetic stack may comprise pairs of alternating layers of platinum and cobalt. In that case, each of the layers of platinum in the multi-layered stack may define a thickness between approximately 0.5 and 2.5 nanometers, such as a thickness of approximately 1.0 nanometer, and each of the layers of cobalt in the multi-layered stack may define a thickness between approximately 0.15 and 1.0 nanometers, such as a thickness of approximately 0.35 nanometers. The number of pairs of alternating layers of platinum and cobalt may be approximately between 5 and 50. For example, 9 pairs of alternating layers of platinum and cobalt may be used. The overall thickness of the multi-layered stack may be in the range of approximately 5 to 50 nanometers. In an alternative embodiment, the seed layer comprises palladium. In that case, the multi-layered magnetic stack may include thin layers of palladium and cobalt.

The seed layer may include face centered cubic (FCC) crystallites in a (111) orientation. This desirable crystalline texture can be achieved because the nature of the amorphous underlayer allows the seed layer to naturally orient itself with little or no interaction with the underlayer. The multi-layered magnetic stack may comprise pairs of alternating layers of platinum and cobalt including face centered cubic (FCC) crystallites in a (111) orientation. The magnetic recording medium may exhibit a coercivity greater than 4000 Oersteds, greater than 4500, or greater than 5000 Oersteds. The underlayer and seed layer thicknesses can be selected as outlined in greater detail below in order to achieve these high levels of coercivity. Additionally, the magnetic recording medium may exhibit a hysteresis curve having a switching field distribution (SFD) less than 30 percent of its coercivity, and a nucleation field greater than 80 percent of its coercivity. The medium may exhibit an anisotropy greater than $4.0*10^6$ ergs/cm$^3$.

In other embodiments, the invention may be directed to a magnetic storage device such as a magnetic tape drive, a magnetic disk drive, a hard disk drive, a floppy disk drive, a magnetic tape cartridge drive, or the like. In any case, the magnetic storage device may include a magnetic storage medium, a head to detect magnetic domains on the medium, a controller that controls a position of the head relative to the medium, and a signal processor that interprets detected magnetic domains. The magnetic storage medium may include a substrate, an amorphous underlayer formed over the substrate, a seed layer of platinum formed over the amorphous underlayer, and a multi-layered magnetic stack formed over the seed layer, wherein the multi-layered magnetic stack includes alternating layers of platinum and cobalt each having a thickness of less than or equal to approximately 3 nanometers.

The invention may be capable of providing one or more advantages. For example, perpendicular magnetic media according to the principles of the invention may achieve higher storage densities than conventional longitudinal media. The structures and compositions described below may also provide improved stability against thermal decay relative to some conventional longitudinal and other perpendicular recording media. Also, the invention may provide compatibility with low temperature thin film processes. Low temperature thin film processing, in turn, allows plastic substrates to be used, which may reduce the costs associated with media. In addition, low temperature thin film processing may reduce the time associated with media manufacture. The invention can be used to improve the anisotropy, the coercivity, and the crystal texture, including the crystal phase and the crystalline orientation of various layers.

In addition, by selecting the underlayer and seed layer thicknesses, magnetic anisotropy can be improved, which may in turn improve the storage density and/or the performance and stability of the media. The desired thickness ranges may be different depending on the substrate material. In any event, by defining the thickness of the underlayer and seed layer as outlined in greater detail below, media can be improved.

Additional details of these and other embodiments are set forth in the accompanying drawings and the description below. Other features, objects and advantages will become apparent from the description and drawings, and from the claims.

DETAILED DESCRIPTION

The invention is directed to perpendicular magnetic media. The phrase "perpendicular magnetic media" refers to magnetic media in which anisotropy is perpendicular to the surface of the medium. In contrast, the phrase "longitudinal magnetic media" refers to magnetic media in which magnetic anisotropy is generally parallel to the surface of the medium. Perpendicular media allows for a much higher storage density than can be achieved in longitudinal media. In accordance with the invention, a perpendicular magnetic medium is described that includes a multi-layered magnetic stack having anisotropy that is perpendicular to the surface of the medium.

In this disclosure, the term "multi-layered stack" refers to a collection of layers that together function as a magnetic recording layer. Each of the layers in the multi-layered stack may have an individual layer thickness of less than approximately 3 nanometers. Such a multi-layered stack is sometimes referred to as a nanolayered stack. For example, the multi-layered stack may comprise a stack of two or more materials, each deposited to a thickness less than approximately 3.0 nanometers. The individual layers that form the multi-layered stack may be deposited in an alternating configuration, i.e., with the different materials deposited in an alternating fashion. Each individual layer of the multi-layered stack may have a layer thickness of between approximately 0.1 and 3.0 nanometers. In one example, two materials are used for the multi-layered stack, and an alternating configuration defines pairs of layers in the stack. In that case, the number of pairs in the multi-layered stack may be between 5 and 50, although the invention is not necessarily limited in that respect. In other cases, three or more different layers may define a period of the multi-layered stack. A period is analogous to a pair of layers in a stack, but may include three or more different layers each deposited to a thickness less than approximately 3.0 nanometers.

A multi-layered stack provides a magnetic structure for magnetic recording, and provides a useful alternative to cobalt alloys used for that purpose. As described in greater detail below, an amorphous underlayer such as an underlayer of carbon, followed by a seed layer of platinum can facilitate the realization of perpendicular magnetic media having a multi-layered stack to provide the magnetic structure for magnetic recording. Moreover, an amorphous underlayer of carbon followed by the seed layer of platinum can facilitate creation of perpendicular media without requiring high temperature thin film deposition needed for some conventional media fabrication. The thicknesses of the underlayer and the seed layer can be selected in order to improve media performance, and the desired thicknesses may vary depending on the substrate material that is used.

Figure 1:
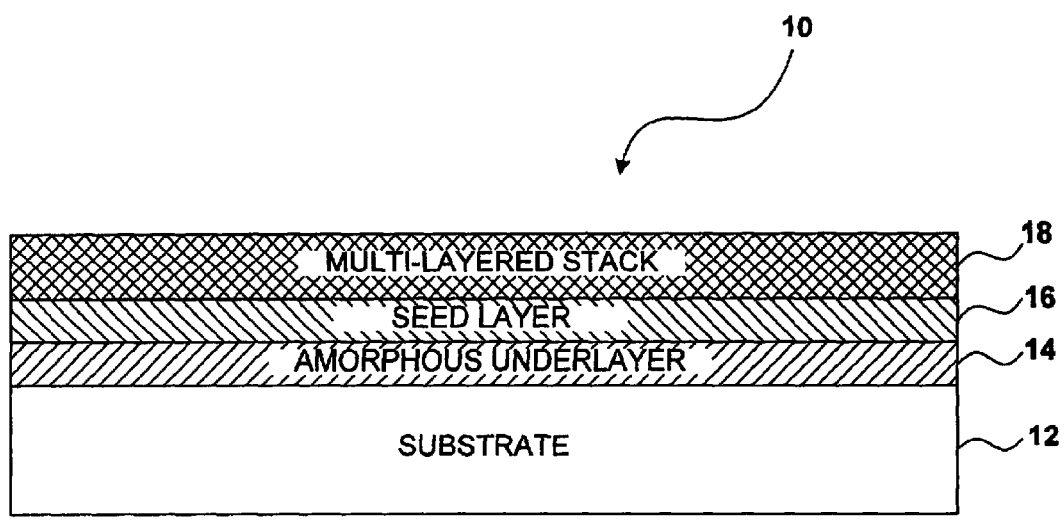
FIG. 1 is an enlarged cross-sectional side view of an exemplary magnetic recording medium according to an embodiment of the invention.

FIG. 1 is an enlarged cross-sectional side view of an exemplary magnetic recording medium 10 according to an embodiment of the invention. By way of example, magnetic recording medium 10 may be a magnetic hard disk, a magnetic diskette, magnetic tape, or the like. In any case, magnetic medium 10 includes a substrate 12, an amorphous underlayer 14 formed over substrate 10, a seed layer 16 formed over the amorphous underlayer 14, and a multi-layered magnetic stack 18 formed over the seed layer 16. The various layers can be deposited upon one another during the media fabrication process using any of a wide variety of conventional deposition techniques. Example deposition techniques include e-beam evaporation and various forms of sputtering such as magnetron sputtering, ion beam sputtering, or the like. Additionally, other layers such as an encapsulating layer between the substrate 12 and amorphous underlayer 14 may be included. Also, one or more additional underlayers, such as a layer of permalloy, may be provided between the substrate 12 and the amorphous underlayer 14. In addition, a barrier layer or hard coat, such as a layer of carbon may be formed over the multi-layered magnetic stack 18.

The amorphous underlayer 14 provides a smooth, high energy interface which promotes high surface mobility of the seed layer adatoms during growth of the seed layer 16. In other words, the microstructural, electrical, and chemical nature of the amorphous underlayer 14 ensures that minimal interaction occurs between the underlayer 14 and the seed layer 16 during deposition of the seed layer 16. Therefore, the seed layer 16 can naturally orient itself with minimal influence from the amorphous underlayer 14. For example, an amorphous underlayer 14 comprising a thin layer of carbon may allow a seed layer 16 comprising platinum to assume a crystal texture characterized by face centered cubic (FCC) crystallites in a (111) orientation. In that case, the adatoms of the growing seed layer 16 interact more strongly with one another during deposition than they do with the underlayer 14 because of the chemical, microstructural, and electrical properties of the underlayer 14. The interaction of the adatoms of the seed layer 16 with one another may result in the desired crystal texture simply by virtue of the adatoms orienting themselves in a low energy, close-pack configuration equivalent to that of the FCC plane normal to the (111) axis.

The seed layer 16, having the crystal texture characterized by face centered cubic (FCC) crystallites in a (111) orientation, interacts with the multi-layered magnetic stack 18 during deposition of the multiple layers of the stack so that anisotropy is perpendicular to the surface of the medium. In this manner, high perpendicular magnetic anisotropy can be achieved and storage densities can be increased. If desired, additional layers may be added over the multi-layered stack 18, such as one or more barrier layers to improve environmental stability, or to improve head flyability. For example, another layer of carbon may be added over the multi-layered stack 18 to form a hard coat.

Substrate 12 may comprise glass, plastic, organic resin, metal, or any other suitable substrate material. The described structures and compositions may be particularly useful when plastic substrates are used because high temperatures required for creation of some conventional media can be avoided. In other words, the invention may realize perpendicular magnetic anisotropy on a medium that includes a plastic substrate. The use of plastic as a substrate material is advantageous because it can be injection molded quickly and easily, and can be formed at relatively low cost. In accordance with the invention, perpendicular magnetic media including a multi-layered magnetic stack can be created by deposition processes carried out at temperatures less than 50 degrees Celsius, less than 40 degrees Celsius, or even less than 30 degrees Celsius. For example, media can be created by deposition processes performed at room temperature, i.e., at or near approximately 24 degrees Celsius.

Depending on the substrate material used, different thicknesses of the amorphous underlayer 14 and the seed layer 16 may be more effective in achieving advantageous qualities in medium 10, such as high coercivity. High coercivity is advantageous because it can improve magnetic stability and reliability of information recorded on medium 10.

Amorphous underlayer 14 may comprise carbon, boron, silicon carbide, chromium, or another sufficiently amorphous material. The amorphous underlayer may define a thickness less than approximately 100 nanometers. The seed layer 16 may comprise platinum, or possibly a platinum alloy, such as a platinum-palladium alloy. In that case, the seed layer of platinum may define a thickness between approximately 1 and 100 nanometers, or more specifically between approximately 2.5 and 25 nanometers. Alternatively, seed layer 16 may comprise palladium.

In one embodiment, the multi-layered magnetic stack 18 comprises pairs of alternating layers of platinum and cobalt. In another embodiment, the multi-layered magnetic stack 18 comprises pairs of alternating layers of palladium and cobalt. In still other embodiments, three or more different layers may be included in the multi-layered stack. By depositing the amorphous underlayer 14, followed by the seed layer 16, high perpendicular magnetic anisotropy in a subsequently deposited multi-layered stack 18 can be achieved. In this manner, improved perpendicular magnetic anisotropy over that of conventional cobalt alloys can be achieved. Also, the deposition processes for creating the described media can be carried out at temperatures less than one or more of those listed above, which can facilitate the use of various plastic materials for substrate 12.

Figure 2:
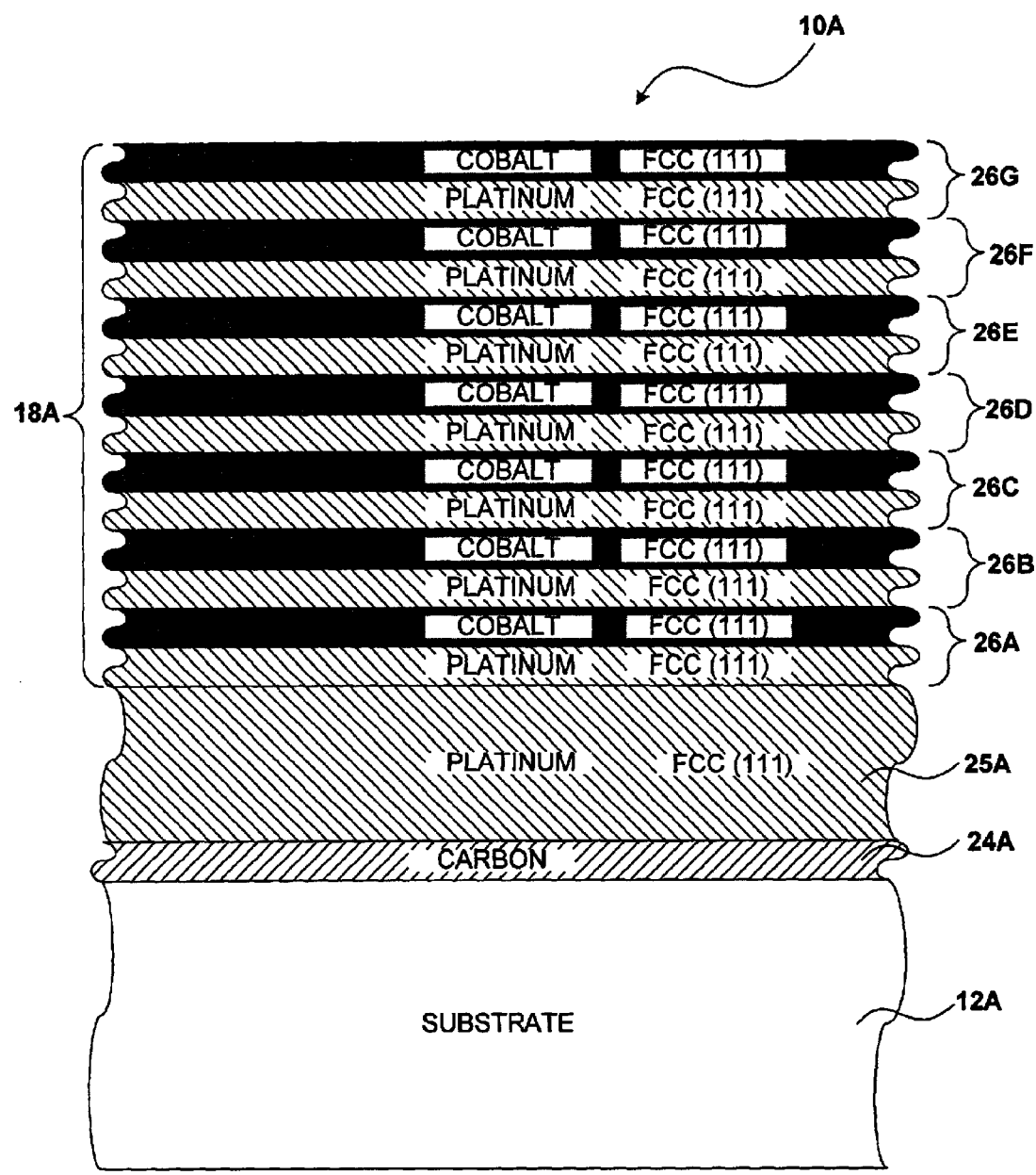
FIGS. 2 and 3 are enlarged cross-sectional side views of a portion of exemplary magnetic recording media according to two embodiments of the invention.

FIG. 2 is an enlarged cross-sectional side view of a portion of an exemplary magnetic recording medium according to an embodiment of the invention. As shown, medium 10A includes a substrate 12A, a layer of carbon 24A formed over the substrate 12A, a layer of platinum 25A formed over the layer of carbon 24A, and a multi-layered magnetic stack 18A formed over the layer of platinum 25A. Again, in some embodiments, additional layers may also be included, such as an encapsulating layer to encapsulate the substrate or an additional magnetic underlayer to further improve record densities.

The various layers illustrated in FIG. 2 are labeled to describe the crystal texture of the different layers. The term "crystal texture" refers collectively to the crystal phase and the crystalline orientation of a layer. The layer of carbon 24A does not include a crystal texture label because it is characterized as being amorphous. In other words, the atoms in the layer of carbon 24A generally have little or no spatial order.

The layer of carbon 24A may be further characterized as having a surface which promotes natural epitaxy of the platinum seed layer 25A. Natural epitaxy generally occurs when the deposited adatoms have high mobility and high interfacial energy with the underlayer. High mobility generally requires the underlayer to be amorphous, smooth, and dense. High interface energy results from chemical and electrical properties of the underlayer and the depositing adatoms which minimize their interaction. High mobility and high interface energy can be achieved for platinum adatoms on a carbon underlayer prepared in a sufficiently amorphous, smooth, and dense state. High interface energy means that the seed layer adatoms do not strongly react with the underlayer. High interface energy characteristic of platinum adatoms on carbon ensures that little or no bonding can occur between the underlayer of carbon 24A and the subsequently deposited layer of platinum 25A.

The term "amorphous" refers to atomic ordering that is generally random. Smooth surface qualities refer to a surface that generally has an arithmetic average roughness of less than approximately 1.0 nm when measured by an AFM (atomic force microscope), and dense coverage generally means that inter-columnar voids generally do not exist in the layer. Thick layers of carbon, i.e., greater than 100 nanometers may result in a non-smooth surface. Also, thick layers of carbon may reduce the amorphous nature of the layer and reduce the density of the layer, which is undesirable. For these reasons, it is highly desirable to limit the thickness of the layer of carbon 24A in order to enhance one or more qualities which promote natural epitaxy of the subsequently deposited seed layer.

The layer of platinum 25A may include face centered cubic (FCC) crystallites in a (111) orientation. In other words, the crystal phase of the platinum layer 25A is FCC and the crystalline orientation is (111). The notation "(111)" refers to an orientation in which the individual (111) axis of the FCC crystallites are oriented perpendicular to the surface of the medium. In some cases, the layer of platinum 25A may consist essentially of face centered cubic (FCC) crystallites in a (111) orientation. This desirable crystalline texture can be achieved because the microstructural, chemical, and electrical nature of the layer of carbon 24A allows the platinum layer 25A to orient itself with minimal influence from the atomic configuration of the layer of carbon 24A.

The multi-layered magnetic stack 18A may comprise pairs 26A–26G (sometimes referred to as periods) of alternating layers of platinum and cobalt including face centered cubic (FCC) crystallites in a (111) orientation. In some cases, the pairs 26A–26G of alternating layers of platinum and cobalt consist essentially of face centered cubic (FCC) crystallites in a (111) orientation.

The layers of platinum in the multi-layered stack may define a thickness between approximately 0.5 and 2.5 nanometers, such as a thickness of approximately 1.0 nanometer, and the layers of cobalt in the multi-layered stack may define a thickness between approximately 0.15 and 1.0 nanometers, such as a thickness of approximately 0.35 nanometers. The number of pairs 26 of alternating layers of platinum and cobalt may be between approximately 5 and 50. For example, 9 pairs of alternating layers of platinum and cobalt may be used. The overall thickness of multi-layered stack 18A may be in the range of approximately 5 to 50 nanometers. For simplicity in the illustrated example, however, seven pairs 26A–26G of alternating layers of platinum and cobalt are shown. Medium 10A may exhibit a magnetic anisotropy greater than $4.0*10^6$ ergs/cm$^3$.

The thicknesses of the layer of carbon 24A and the layer of platinum 25A can be selected in order to improve media performance, and the desired thicknesses may vary depending on the substrate material that is used. For example, it may be desirable to limit the thickness of the layer of carbon 24A in order to promote natural epitaxy of the subsequently deposited seed layer. In one example, where the substrate includes glass, the layer of carbon 24A defines a thickness between approximately 0.5 and 10.0 nanometers, and more specifically between approximately 1.0 and 5.0 nanometers. In that case, the layer of platinum may define a thickness between approximately 2.5 and 25 nanometers. When the layer of carbon 24A defines a thickness less than approximately 5.0 nanometers, the medium may exhibit a coercivity greater than 4500 Oersteds. In that case, the layer of platinum may have a thickness on the order of 20 nanometers.

In another example, where the substrate includes plastic, the layer of carbon may define a thickness between approximately 0.1 and 5.0 nanometers. In that case, the medium 10A may exhibit a coercivity greater than 4500 Oersteds, or greater than 5000 Oersteds. The layer of platinum may have a thickness on the order of 20 nanometers.

Figure 3:
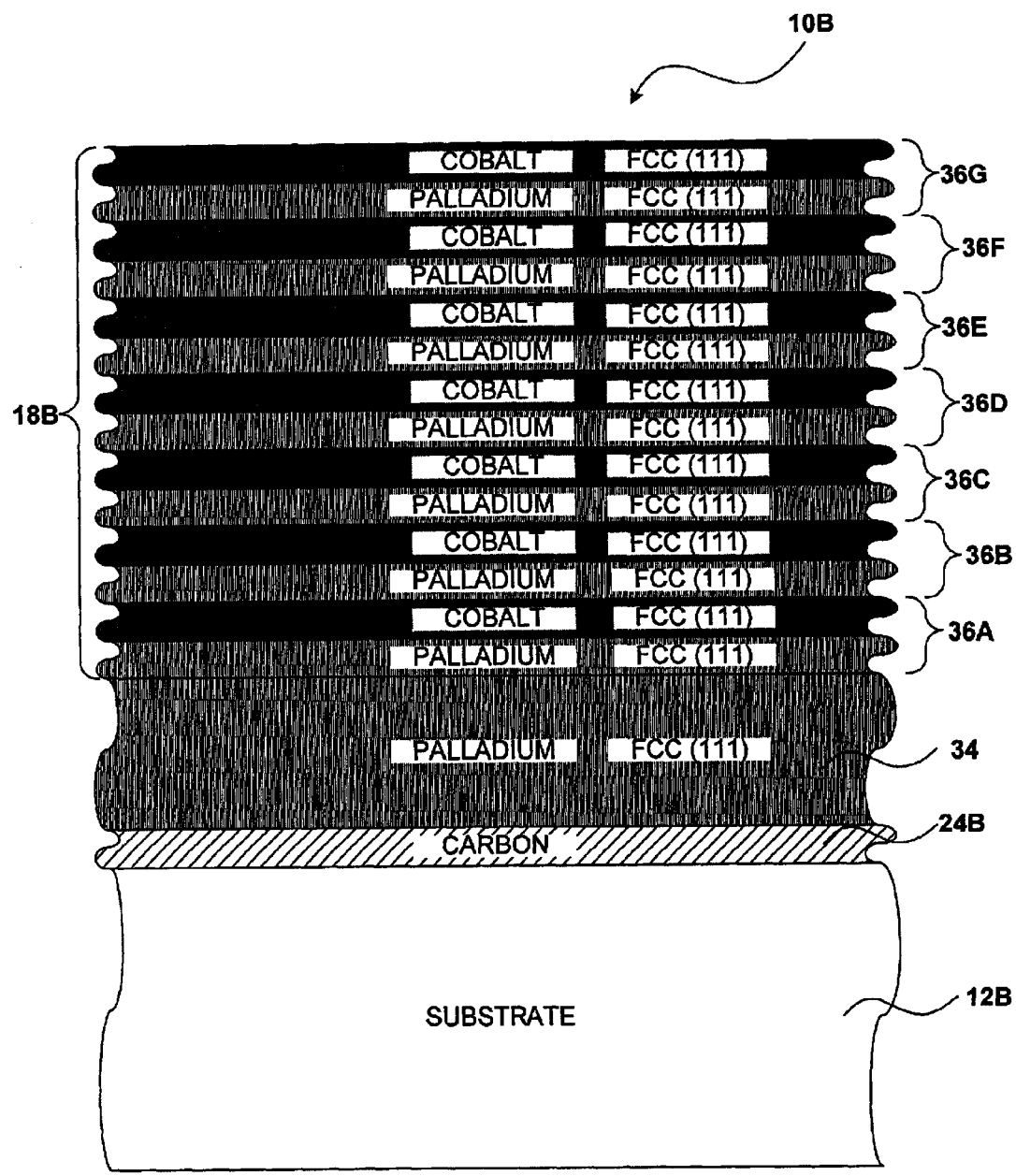

FIG. 3 is another enlarged cross-sectional side view of a portion of an exemplary magnetic recording medium according to another embodiment of the invention. As shown, medium 10B includes a substrate 12B, a layer of carbon 24B formed over substrate 10B, a layer of palladium 34 formed over the layer carbon 24B, and a multi-layered magnetic stack 18B formed over the layer of palladium 34. In some embodiments, additional layers may also be included.

In the example of FIG. 3, the multi-layered magnetic stack includes pairs 36A–36G of alternating layers of palladium and cobalt. In that case, the layers of palladium in multi-layered stack 18B may define a thickness between approximately 0.3 and 1.8 nanometers, and the layers of cobalt in multi-layered stack 18B may define a thickness between approximately 0.15 and 1.0 nanometers. The number of pairs 36 of alternating layers of palladium and cobalt may be between approximately 5 and 50. The overall thickness of multi-layered stack 18B may be in the range of approximately 5 to 50 nanometers. For simplicity, however, seven pairs 36A–36G of alternating layers of palladium and cobalt are illustrated.

The layer of carbon 24B may be characterized as being amorphous, and more specifically as promoting natural epitaxy as outlined in greater detail above. As labeled in FIG. 3, the layer of palladium 34 may include face centered cubic (FCC) crystallites in a (111) orientation. In some cases, the layer of palladium 34 may consist essentially of face centered cubic (FCC) crystallites in a (111) orientation. The multi-layered magnetic stack 18B may comprise pairs 36A–36G of alternating layers of palladium and cobalt including face centered cubic (FCC) crystallites in a (111) orientation. In some cases, the pairs 36A–36G of alternating layers of palladium and cobalt consist essentially of face centered cubic (FCC) crystallites in a (111) orientation.

In still other embodiments, a medium may include an amorphous underlayer followed by a seed layer of platinum, followed by a multi-layered stack that includes alternating layers of palladium and cobalt. Also, a medium may include an amorphous underlayer followed by a seed layer of palladium, followed by a multi-layered stack that includes alternating layers of platinum and cobalt. In other words, palladium and platinum may be substituted for one another in various different embodiments. In some cases, a palladium-platinum alloy may be used. During deposition of the multi-layered stack, the cobalt may be deposited first, or alternatively the palladium or platinum may be deposited first as shown in FIGS. 2 and 3. These and other modifications will become apparent in light of this disclosure.

Figure 4:
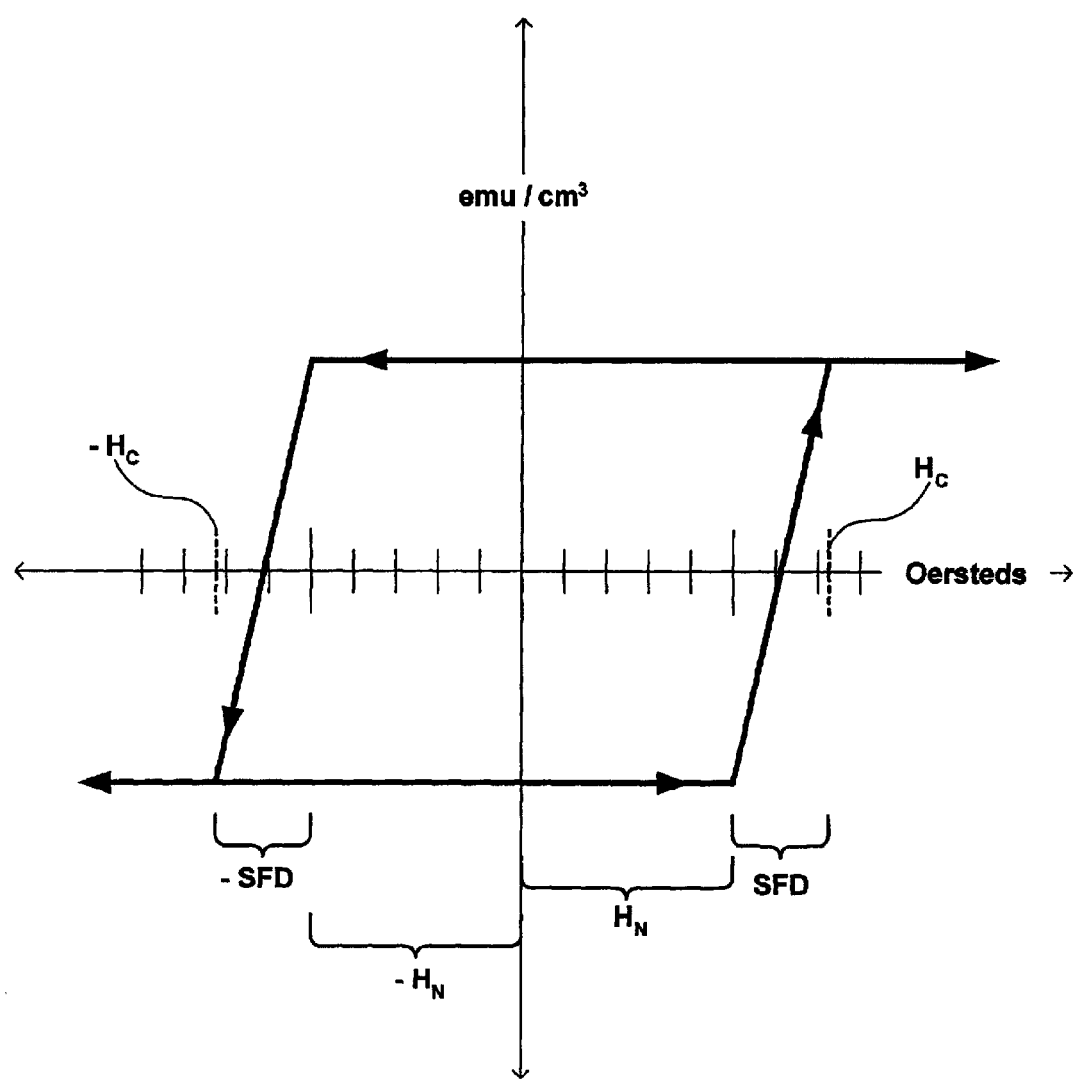
FIG. 4 is a graph of a hysteresis curve used to explain various qualities of media conforming to one or more embodiments described herein.

FIG. 4 is a graph of a hysteresis curve illustrating various qualities of media conforming to one or more embodiments described herein. In particular, medium 10 may exhibit a coercivity ($H_C$) between approximately 2000 and 10,000 Oersteds. Coercivity refers to the magnetic field strength needed to reverse a given magnetization. For example, magnetic recording medium 10 may exhibit a coercivity greater than approximately 2000 Oersteds, greater than approximately 3000 Oersteds, greater than approximately 4000 Oersteds, greater than approximately 4500 Oersteds, greater than approximately 5000 Oersteds, greater than approximately 6000 Oersteds, or greater than approximately 7000 Oersteds. High coercivity may improve magnetic stability and reliability of medium 10.

Additionally, medium 10 may exhibit a hysteresis curve having a switching field distribution (SFD) less than 30 percent of its coercivity ($H_C$), and a nucleation field ($H_N$) greater than 80 percent of its coercivity ($H_C$). The switching field distribution refers to the interval of magnetic field strength over which a given magnetization can be completely reversed. Small switching field distributions relative to the coercivity may further improve record performance of medium 10 by improving the signal to noise (S/N) ratio. M(H) in the switching field region may be linear as illustrated in FIG. 4, but generally is non-linear. The nucleation field refers to the point of magnetic field strength when the magnetization begins to switch. Large nucleation fields relative to the coercivity may improve magnetic stability and reliability of medium 10.

Figure 5:
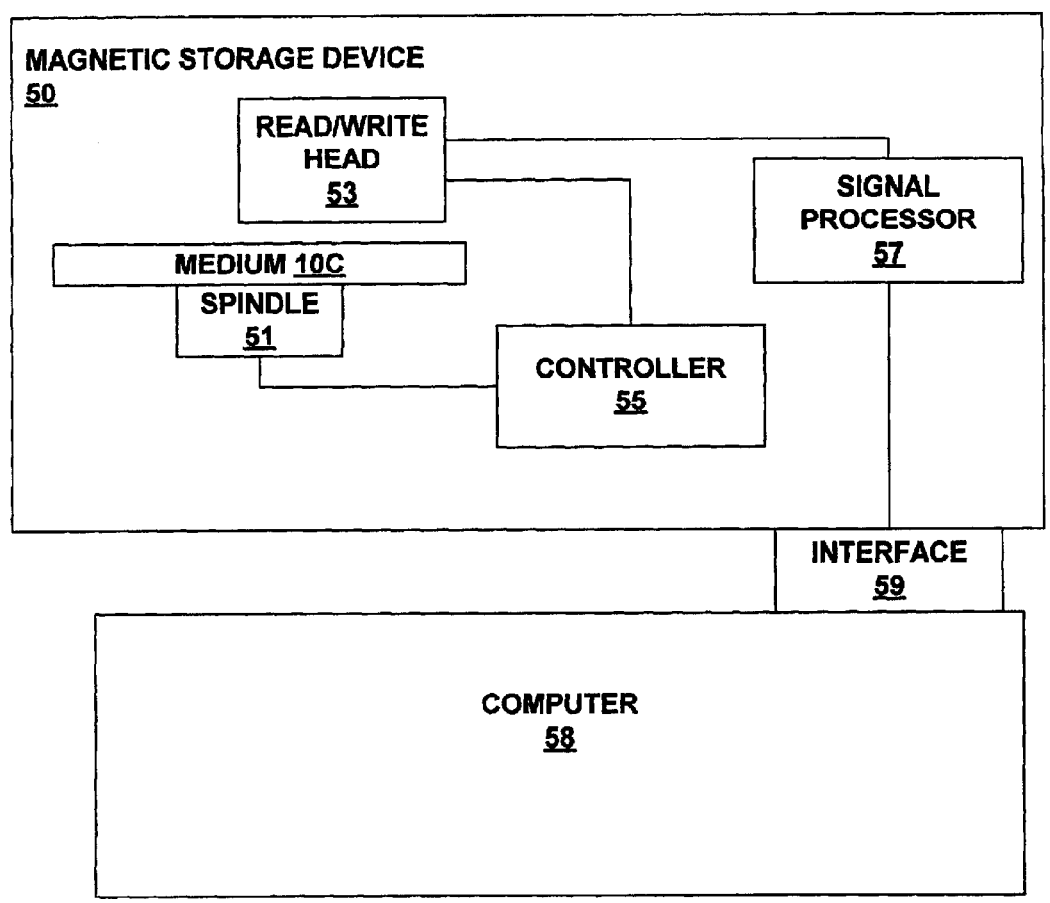
FIGS. 5 and 6 are exemplary block diagrams of magnetic storage devices that may be used to read or write data to media in accordance with embodiments of the invention.
Figure 6:
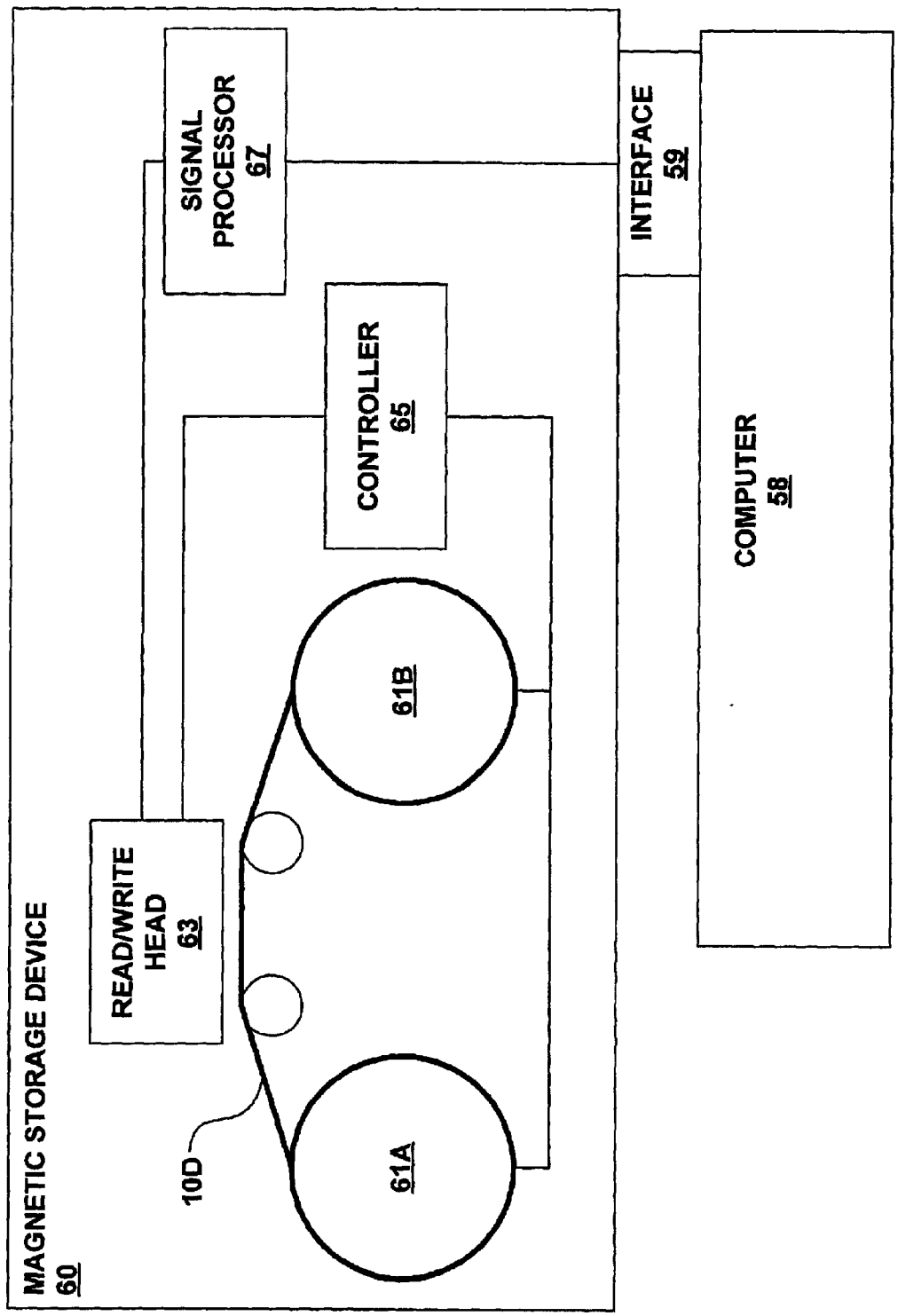

FIGS. 5 and 6 are block diagrams of exemplary magnetic storage devices that may be used to read or record data on media described herein. As shown in FIG. 5, magnetic storage device 50 may be used with a disk shaped medium 10C. In that case, magnetic storage device 50 may comprise a magnetic disk drive, a hard disk drive, a floppy disk drive, or the like. The magnetic storage medium 10C may include a substrate, an amorphous underlayer formed over the substrate, a seed layer formed over the amorphous underlayer, and a multi-layered magnetic stack formed over the seed layer. Spindle 51 may be used to spin medium 10C and read/write head 53 may be positioned to detect magnetic domains on medium 10C. A controller 55 controls spindle 51 and read/write head 53 to precisely position read write head 53 relative to medium 10C. A signal processor 57 interprets detected magnetic domains.

As illustrated, magnetic storage device 50 may be coupled to a computer 58 via an interface 59. For example, computer 58 may comprise a central processing unit for any of a variety of computer devices, including, for example, a PC, a Macintosh, a computer workstation, a hand-held data terminal, a palm computer, a cell phone, digital paper, a digital television, a wireless device (in which case interface 59 may be wireless), a personal digital assistant, a laptop computer, a desktop computer, a digital camera, a digital recording device, or the like.

As shown in FIG. 6, magnetic storage device 60 may be used with a medium 10D that includes magnetic tape. In that case, magnetic storage device 60 may comprise a magnetic tape drive, a magnetic tape cartridge drive, or the like. Medium 10D may include magnetic tape spooled onto one or more spools 61A and 61B. Spools 61 may be housed in a cartridge, although the invention is not limited in that respect. The magnetic storage medium 10D in the form of magnetic tape may include a substrate, an amorphous underlayer formed over the substrate, a seed layer formed over the amorphous underlayer, and a multi-layered magnetic stack formed over the seed layer. Read/write head 63 may be positioned to detect magnetic domains on medium 10D. A controller 65 controls the positioning of read/write head 63 as well as the movement of medium 10D such as by turning spools 61A and/or 61B to precisely position read write head 63 relative to medium 10D. A signal processor 67 interprets detected magnetic domains.

Like in FIG. 5, magnetic storage device 60 of FIG. 6 may be coupled to a computer 58 via an interface 59. Again, computer 58 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like.

The invention may be capable of providing a number of advantages. In particular, perpendicular magnetic media according to the principles of the invention may achieve higher storage densities than conventional longitudinal media. Also, the structures and compositions described below may provide improved stability against thermal decay relative to some conventional media. In addition, the invention may provide compatibility with low temperature thin film deposition processes. Lower temperature thin film deposition processes, in turn, may allow plastic substrates to be used, which can reduce the cost of media. The invention can be used to improve crystal texture of media as shown and described with reference to FIGS. 2 and 3, such as by improving the crystal phase and the crystalline orientation of various layers.

The invention may also be used to improve the coercivity, the switching field distribution, and/or the nucleation field of media as shown and described with reference to the graph of FIG. 4. The magnetic anisotropy can also be improved. In short, in accordance with the principles described herein, improved perpendicular media can be realized. Various layer thicknesses have been described which may be critical to achieving such improvements. The following examples may provide additional details of media in accordance with the invention.

EXAMPLES

Figure 7:
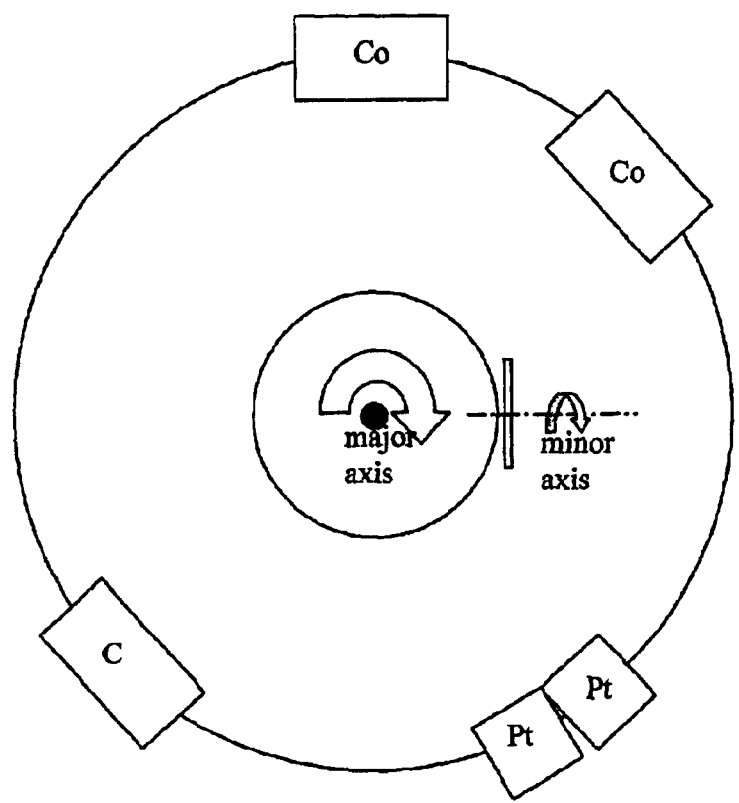
FIG. 7 is a conceptual diagram illustrating deposition techniques used in the examples described herein.

The thin films of the following examples were coated in a high vacuum sputtering system equipped with a planetary. The planetary was made to revolve about its major axis, passing the substrate opposite the sputter sources in the system in a repetitive fashion, or was made to fix the substrate at a position directly opposite a specified sputter source for a designated time interval. In both modes of operation the substrate was always made to spin around its own minor axis such as illustrated in FIG. 7. In all of the examples, the depositions were performed near room temperature, i.e., at approximately 24 degrees Celsius. The substrates were not actively heated during the depositions.

The sputter sources used in all of the examples were DC magnetrons. The sources in the system included a C source, two Co sources, and two Pt sources. The C and Co sputter sources were all 6" in diameter. The Pt sources were 3" in diameter and were located side by side with the cathode ground shields less than 5 mm apart from one another. Ar was used as the sputtering gas in all of the examples. The distance from the front of a sputter source cathode to a substrate directly opposite the source was 10 cm. M(H) measurement results, i.e., hysteresis curves, shown in each example were obtained using an ADE Technologies DMS Model 880 VSM (vibrating sample magnetometer.) X-ray diffraction (XRD) results were obtained using a Siemens D5005 X-ray diffractometer. All XRD measurements were made with the same step size and sample time.

Example 1

In this example, Sample 1 was prepared using a soda lime glass substrate which was mounted onto the planetary sample platten. The system was pumped to a base pressure of 6.0 E-9 Torr. The Sample 1 substrate was then positioned directly opposite the C sputter source. With a major axis speed of 0.0 rev/sec and a minor axis speed of 1.5 rev/sec, 25 angstroms (Å) of C was deposited at a source power of 500 W and an Ar pressure of 2 mT. Then with the substrate directly opposite, and symmetrically disposed between the two Pt sources, at a major axis speed of 0 rev/sec and a minor axis speed of 1.5 rev/sec, 200 Å of Pt was deposited with each Pt source operated at 75 W at an Ar pressure of 2 mT. Finally 50 Å of C was deposited at a major axis speed of 0.4 rev/sec and a minor axis speed of 3.2 rev/sec, with the C source operated at 500 W at an Ar pressure of 2 mT.

Sample 2 was prepared using a soda lime glass substrate which was mounted onto the planetary sample platten. The system was pumped to a base pressure of 1.3 E-9 Torr. With the substrate positioned directly opposite, and symmetrically disposed between the two Pt sources, at a major axis speed of 0 rev/sec and a minor axis speed of 1.5 rev/sec, 200 Å of Pt was deposited with each Pt source operated at 75 W at an Ar pressure of 2 mT. Finally 50 Å of C was deposited at a major axis speed of 0.4 rev/sec and a minor axis speed of 3.2 rev/sec, with the C source operated at 500 W at an Ar pressure of 2 mT.

Figure 8:
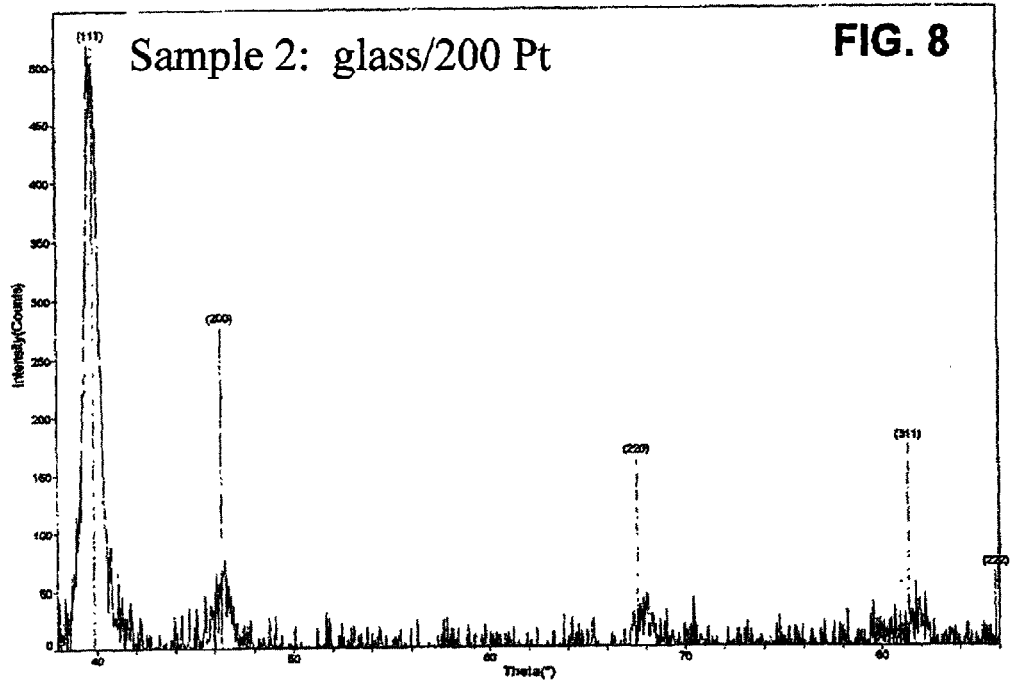
FIGS. 8–10 and FIG. 12 are graphs illustrating X-ray diffraction spectra of media created according to various examples.
Figure 9:
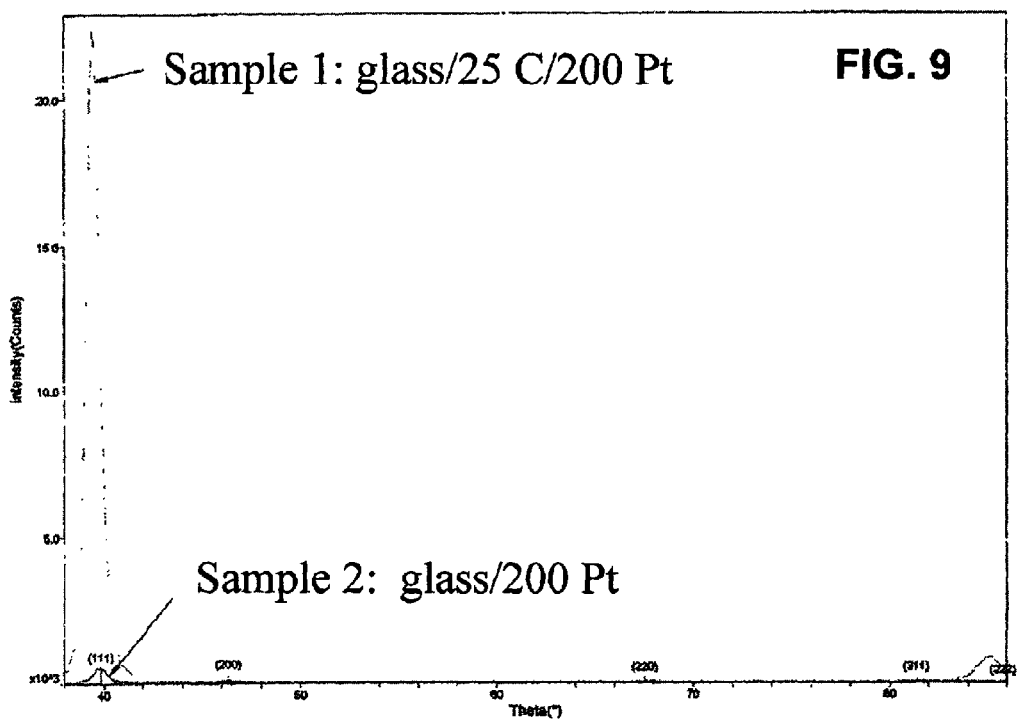

X-ray diffraction was carried out on these two samples with substantially identical measurement conditions of step size and dwell time. Results are shown in FIG. 8 and FIG. 9. FIG. 8 shows the XRD results for Sample 2 only. In addition to the Pt FCC (111) peak, several other peaks representing other FCC orientations are present, and the peak-intensity-to-baseline-noise ratio is relatively low. FIG. 9 shows the XRD results for Sample 1 and Sample 2 together. As can be appreciated by FIG. 9, the Pt layer of Sample 1, with the C underlayer, has a much stronger FCC (111) crystal orientation than Sample 2. The peak intensity of the Pt (111) peak is more than an order or magnitude greater for Sample 1 than for Sample 2.

Example 2

In this example, XRD samples were prepared with the general construction of: glass substrate/C/Pt/C. Five C underlayer thicknesses were used: 0, 10, 25, 50, and 400 Å; and for each C underlayer thickness, three Pt layer thicknesses were used: 25, 50, and 200 Å; for a total of fifteen samples.

Each sample was prepared using a soda lime glass substrate which was mounted onto the planetary sample platten. In each case, the system was pumped to a base pressure between 4.7 E-9 Torr and 6.0 E-9 Torr. The C underlayer of each sample was formed by positioning the sample substrate directly opposite the C sputtering source, and with a major axis speed of 0 rev/sec and a minor axis speed of 1.5 rev/sec, C was coated at a power of 500 W at an Ar pressure of 2 mT. The C underlayer thickness was controlled by controlling the time of exposure of the sample substrate to the C sputter source. The samples without the C underlayer were not exposed to the C source. C underlayers with thicknesses of 0, 10, 25, 50, and 400 Å were formed on three sample substrates per C underlayer thickness for a total of fifteen samples. The Pt layer for each sample was formed by placing the sample substrate directly opposite, and symmetrically disposed between the two Pt sources. At a major axis speed of 0 rev/sec and a minor axis speed of 1.5 rev/sec, Pt was deposited with each Pt source operated at 75 W at an Ar pressure of 2 mT. The thickness of the Pt layer was controlled by controlling the time of exposure of the sample substrate to the Pt sputter source. For each set of three samples having the same C underlayer thickness, 25 Å of Pt was formed on one, 50 Å of Pt was formed on another, and 200 Å of Pt was formed on the remaining sample. Finally, 50 Å of C was deposited on each sample at a major axis speed of 0.4 rev/sec and a minor axis speed of 3.2 rev/sec, with the C source operated at 500 W at an Ar pressure of 2 mT.

Figure 10:
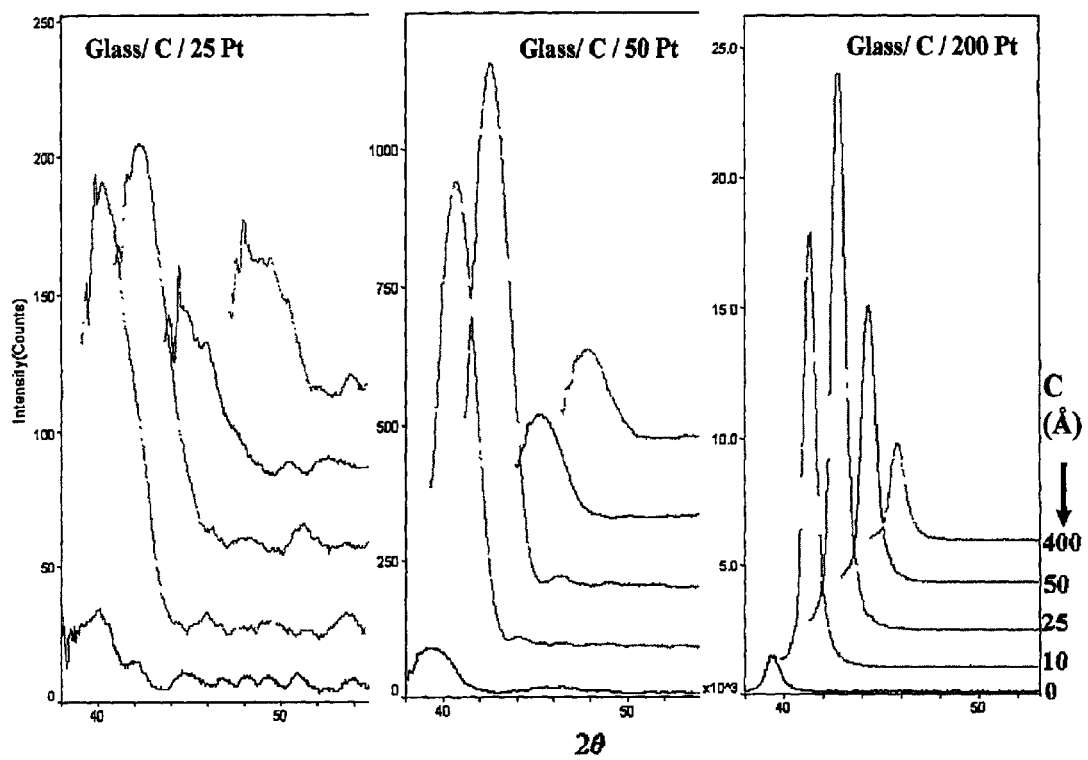

XRD measurements were made on each of the fifteen samples under substantially identical measurement conditions of step size and dwell time. The results are shown in FIG. 10. The XRD scans displayed in FIG. 10 are for 2 θ angles in the vicinity of 39.7 degrees to capture the FCC (111) peak of the Pt. The scans have been offset with one another along both the X and Y axis to facilitate viewing. The peak of each of the scan traces corresponds to the Pt FCC (111) peak, and the base line of each of the scan traces is the flat line extending to the higher 2 θ angles (i.e., to the right of each (111) peak). Peak intensities are then given by the difference between the baseline value and the peak intensity value. The Pt layer thicknesses for each of the sample constructions are labeled in FIG. 10, with the Pt layer thicknesses for the constructions from left to right being 25, 50, and 200 Å. The C underlayer thickness for each of the sample constructions is labeled on the right of FIG. 10 and shows that the C underlayer thicknesses for the sequences of traces from bottom to top is 0, 10, 25, 50, and 400 Å. The full-scale intensity values for each set of scans from left to right is 250, 1250, and 25,000 counts respectively.

The results of FIG. 10 indicate that a very thin C underlayer is very effective in promoting the growth of the Pt (111) texture, and that this effect may be enhanced for C underlayer thicknesses between approximately 10 to 50 Å.

Example 3

In this example, samples for M(H) measurement were prepared with the general construction of: glass substrate/C/Pt/[Co/Pt]/C. Five C underlayer thicknesses were used: 0, 10, 25, 50, and 400 Å; and for each C underlayer thickness, three Pt layer thicknesses were used: 25, 50, and 200 Å; for a total of fifteen samples. The [Co/Pt] multi-layered magnetic layer was the same for each sample.

Each sample was prepared using a soda lime glass substrate which was mounted onto the planetary sample platten. In each case, the system was pumped to a base pressure between 3.9 E-9 Torr and 6.2 E-9 Torr. The method for forming the C underlayer and Pt seed layer for each sample was the same as that used in Example 2 to fabricate the XRD samples having the same C underlayer and Pt layer thicknesses. The [Co/Pt] multi-layered magnetic layer was formed on each of the samples by depositing alternating layers of 3.5 Å of Co and 10 Å of Pt with the planetary major axis speed of 0.12 rev/sec and a minor axis speed of 2.88 rev/sec. Each of the two Co sources was operated at 109 W and each of the two Pt sources were operated at 83 W. Nine periods of Co/Pt were coated for a total thickness of 122 Å. Co was the first layer to be coated. The Ar pressure during the Co/Pt multi-layer deposition was 40 mT. Finally, 60 Å of C was deposited on each of the samples at a major axis speed of 0.4 rev/sec and a minor axis speed of 3.2 rev/sec, with the C source operated at 500 W at an Ar pressure of 2 mT. The measured M(H) loops for each of the samples are shown in the matrix table of FIG. 11. In the matrix of M(H) loops displayed in FIG. 11, the Pt seed layer thicknesses are 25 Å, 50 Å, and 200 Å for each column of loops from left to right, respectively. The C underlayer thicknesses are 0, 10, 25, 50, and 400 Å for each of the rows of loops from bottom to top, respectively. The coercivities of each loop are labeled.

Figure 11:
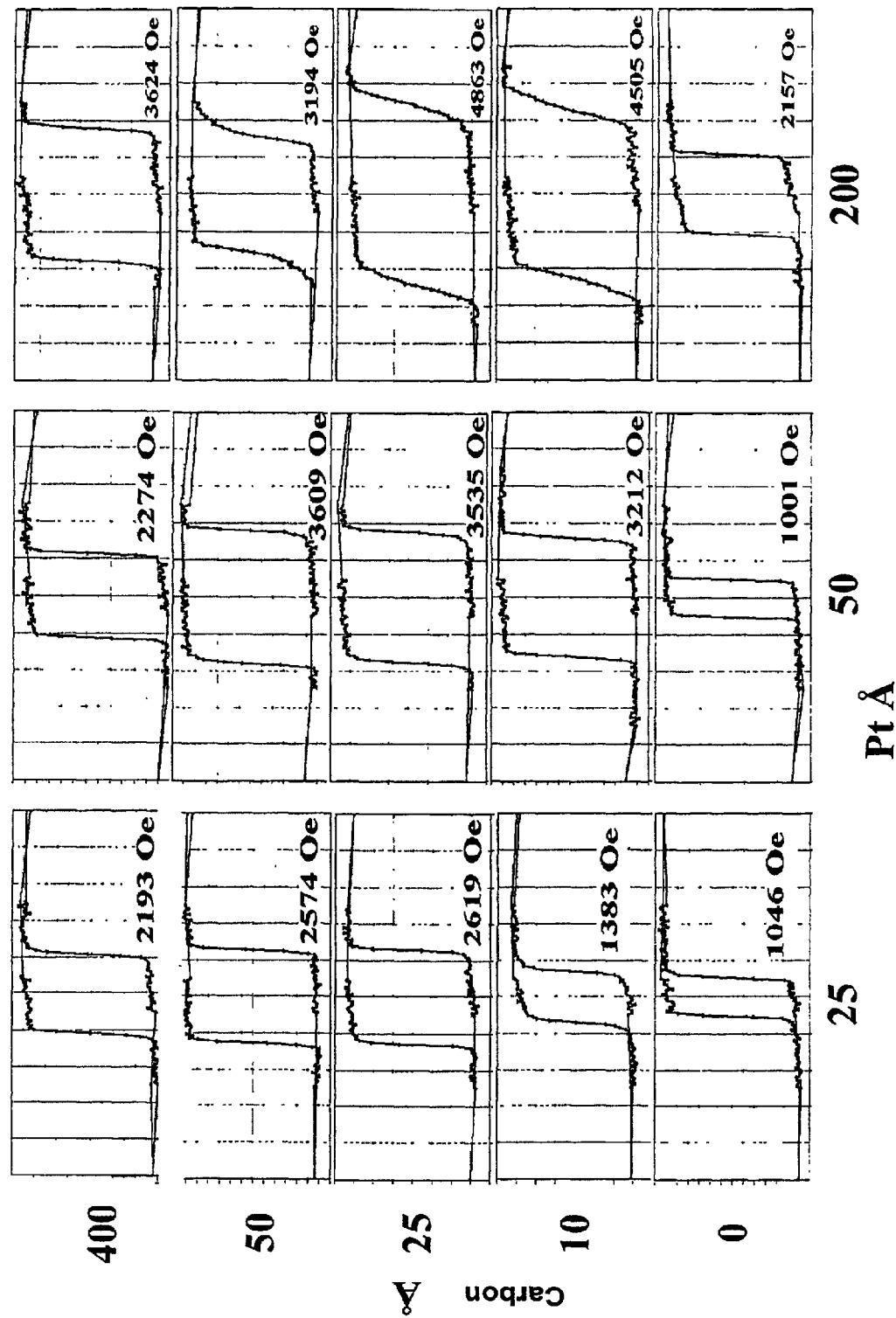
FIGS. 11 and 13 are charts of M(H) hysteresis curves corresponding to various samples created according to various examples.

The results displayed in FIG. 11 illustrate the positive effect of incorporating only a very thin layer of C as an underlayer with more than a doubling of coercivity in some cases by incorporating only a 10 Å underlayer. Coercivities in excess of 4500 Oe were achievable for certain combinations of C underlayer and Pt seed layer thicknesses. Nucleation fields greater than 80% of the coercivity and SFD's less than 30% of the coercivity are also evident from the data for certain combinations of C underlayer and Pt seed layer thicknesses.

Example 4

In this example, XRD samples were prepared with the general construction of: polycarbonate plastic substrate/C/Pt/C. Five C underlayer thicknesses were used: 0, 10, 25, 50, and 400 Å, and for each C underlayer thickness, three Pt layer thicknesses were used: 25, 50, and 200 Å; for a total of fifteen samples.

Figure 12:
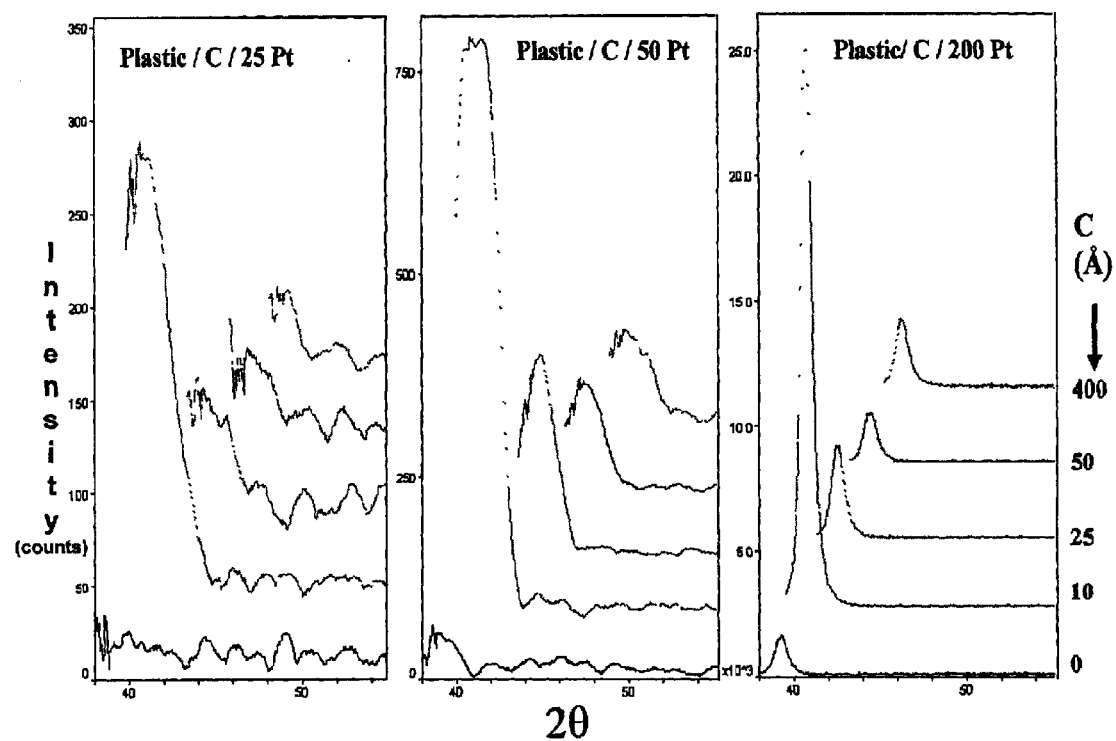

Each sample was prepared using a 0.6 mm thick, flat polycarbonate substrate fabricated by an injection molding process commonly used for forming optical disk substrates. The method for forming the C underlayer and Pt seed layer for each sample was the same as that used in Example 2 to fabricate the XRD samples having the same C underlayer and Pt layer thicknesses with glass substrates. XRD measurements were made on each of the fifteen samples under substantially identical measurements conditions of step size, and dwell time, and are the same as those used to measure the results displayed in FIG. 10. The results are shown in FIG. 12. As in FIG. 10, the XRD scans displayed in FIG. 12 are for 2 θ angles in the vicinity of 39.7 degrees to capture the FCC (111) peak of the Pt.

The scans have been offset with one another along both the X and Y axis to facilitate viewing. The peak of each of the scan traces corresponds to the Pt FCC (111) peak, and the base line of each of the scan traces is the flat line extending to the higher 2 θ angles (i.e., to the right of each (111) peak). Peak intensities are then given by the difference between the baseline value and the peak intensity value. The Pt layer thicknesses for each of the sample constructions are labeled in FIG. 12, with the Pt layer thicknesses for the constructions from left to right being 25, 50, and 200 Å. The C underlayer thickness for each of the sample constructions is labeled on the right of FIG. 12 and shows that the C underlayer thicknesses for the sequences of traces from bottom to top is 0, 10, 25, 50, and 400 Å. Note that the full scale intensity values for each set of scans from left to right is 250, 750, and 25,000 counts respectively.

The results of FIG. 12 indicate that the C underlayer also significantly promotes the growth of the Pt (111) texture when used with a plastic substrate, and moreover, that this effect is even more sensitive to the C underlayer thickness, and may be enhanced at even thinner C underlayer thicknesses of approximately 10 Å.

Example 5

In this example, samples for M(H) measurement were prepared with the general construction of polycarbonate plastic substrate/C/Pt/[Co/Pt]C. Five C underlayer thicknesses were used: 0, 10, 25, 50, and 400 Å; and for each C underlayer thickness, three Pt layer thicknesses were used: 25, 50, and 200 Å; for a total of fifteen samples. The [Co/Pt] multi-layered magnetic layer was the same for each sample.

Each sample was prepared using a 0.6 mm thick, flat polycarbonate substrate fabricated by an injection molding process commonly used for forming optical disk substrates. The method for forming the C underlayer, the Pt seed layer, and the [Co/Pt] multi-layered magnetic layer for each sample was the same as that used in Example 3 to fabricate the M(H) samples having the same C underlayer, Pt seed layer, and [Co/Pt] multi-layered magnetic layer thicknesses.

Figure 13:
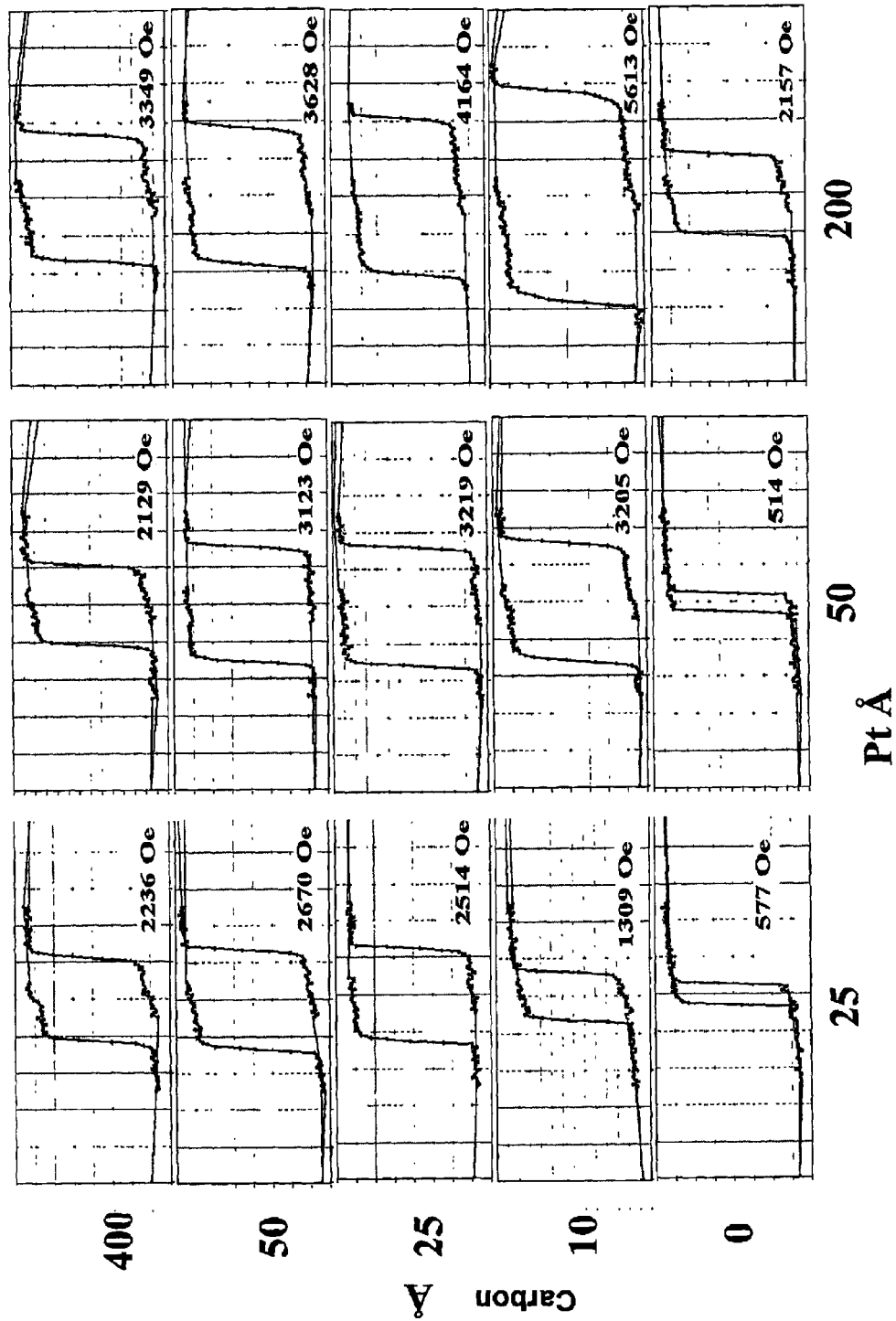

The measured M(H) loops for each of the samples are shown in the matrix table of FIG. 13. In the matrix of M(H) loops displayed in FIG. 13, the Pt seed layer thicknesses are 25 Å, 50 Å, and 200 Å for each column of loops from left to right, respectively. The C underlayer thicknesses are 0, 10, 25, 50, and 400 Å for each of the rows from bottom to top, respectively. FIG. 13 displays a matrix of M(H) loop measurement results. The coercivities of each loop are labeled.

Similar to FIG. 11, the results displayed in FIG. 13 illustrate the positive effect of incorporating only a very thin layer of C as an underlayer only with a plastic substrate. More than a doubling of coercivity is seen in all cases by incorporating only a 10 Å underlayer. Coercivities in excess of 5500 Oe were achievable for certain combinations of C underlayer and Pt seed layer thicknesses. Nucleation fields greater than 80% of the coercivity and SFD's less than 30% of the coercivity are also evident from the data for certain combinations of C underlayer and Pt seed layer thicknesses.

Various embodiments of the invention have been described. For instance, a number of different embodiments of perpendicular magnetic media have been described. Nevertheless, modifications may be made without departing from the scope of the invention. Accordingly, other embodiments are within the scope of the following claims.

What is claimed is:

1. A magnetic recording medium comprising:
   a substrate;
   an amorphous layer formed over the substrate, the amorphous layer comprising carbon and defining a thickness less than approximately 5 nanometers;
   a seed layer including platinum formed over the amorphous layer; and
   a multi-layered magnetic stack formed over the seed layer, wherein the multi-layered magnetic stack includes layers including platinum and layers including cobalt stacked in an alternating arrangement, wherein each of the layers of the multi-layered magnetic stack defines a thickness of less than or equal to approximately 3 nanometers.

2. The magnetic medium of claim 1, wherein the substrate includes a material selected from the group consisting of glass, plastic, organic resin and metal.

3. The magnetic medium of claim 1, wherein the substrate includes plastic.

4. The magnetic medium of claim 1, wherein the amorphous layer consists essentially of carbon.

5. The magnetic medium of claim 4, wherein the seed layer is formed directly on the amorphous layer and the multi-layered magnetic stack is formed directly on the seed layer.

6. The magnetic medium of claim 1, wherein the layers including platinum in the multi-layered stack define a thickness between approximately 0.5 and 2.5 nanometers, and wherein the layers including cobalt in the multi-layered stack define a thickness between approximately 0.15 and 1.0 nanometers.

7. The magnetic medium of claim 1, further comprising a hard coat formed over the multi-layered magnetic stack.

8. The magnetic medium of claim 1, wherein the seed layer of platinum defines a thickness between approximately 1 and 100 nanometers.

9. The magnetic medium of claim 1, wherein the seed layer of platinum consists essentially of face centered cubic (FCC) crystallites in a (111) orientation.

10. The magnetic medium of claim 9, wherein the alternating layers of platinum and cobalt in the multi-layered stack consist essentially of face centered cubic (FCC) crystallites in a (111) orientation.

11. The magnetic medium of claim 1, wherein the substrate comprises glass, and wherein the amorphous layer defines a thickness between approximately 0.5 and 5 nanometers.

12. The magnetic medium of claim 11, wherein the amorphous layer defines a thickness between approximately 1.0 and 5.0 nanometers.

13. The magnetic medium of claim 11, wherein the medium exhibits a coercivity greater than 4000 Oersteds.

14. The magnetic medium of claim 1, wherein the substrate comprises plastic, and wherein the amorphus layer defines a thickness between approximately 0.1 and 5.0 nanometers.

15. The magnetic medium of claim 14, wherein the medium exhibits a coercivity greater than 4000 Oersteds.

16. The magnetic medium of claim 15, wherein the medium exhibits a coercivity greater than 5000 Oersteds.

17. The magnetic medium of claim 1, wherein the medium exhibits a hysteresis curve having a switching field distribution (SFD) less than approximately 30 percent of its coercivity.

18. The magnetic medium of claim 1, wherein the medium exhibits a hysteresis curve having a nucleation field greater than approximately 80 percent of its coercivity.

19. The magnetic medium of claim 1, wherein the medium exhibits an anisotropy greater than approximately $4.0*10^6$ ergs/cm$^3$.

20. The magnetic medium of claim 1, further comprising at least one layer formed between the substrate and the amorphous layer.

21. A magnetic medium comprising:
a substrate;
an amorphous layer formed over the substrate, wherein the amorphous layer includes carbon and defines a thickness less than approximately 5 nanometers and between approximately 0.1 and 5 nanometers;
a seed layer including platinum formed over the amorphous layer; and
a multi-layered magnetic stack formed over the seed layer, wherein the multi-layered magnetic stack includes alternating layers of different materials, wherein each layer of the multi-layered magnetic stack defines a thickness of less than or equal to approximately 3 nanometers, and wherein the medium exhibits a coercivity greater than approximately 4500 Oersteds.

22. The medium of claim 21, wherein the seed layer comprising platinum consisting essentially of face centered cubic (FCC) crystallites in a (111) orientation, and wherein the multi-layered magnetic stack comprises pairs of alternating layers of platinum and cobalt consisting essentially of face centered cubic (FCC) crystallites in a (111) orientation.

23. The medium of claim 22, wherein the substrate comprises plastic, wherein the seed layer comprising platinum defines a thickness between approximately 2.5 and 25 nanometers.

24. The medium of claim 22, wherein the substrate comprises glass, wherein the seed layer comprising platinum defines a thickness between approximately 2.5 and 25 nanometers.

25. A magnetic medium comprising:
a substrate;
an amorphous layer formed directly on the substrate, wherein the amorphous layer includes carbon and defines a thickness less than approximately 5 nanometers;
a layer including platinum formed directly on the amorphous layer, wherein the layer including platinum consists essentially of face centered cubic (FCC) crystallites in a (111) orientation and forms a seed layer; and
a multi-layered magnetic stack formed directly on the layer including platinum, wherein the multi-layered magnetic stack includes layers including platinum and layers including cobalt stacked in an alternating arrangement, wherein the layers of the multi-layered magnetic stack consist essentially of face centered cubic (FCC) crystallites in a (111) orientation.

26. A magnetic storage device comprising:
a magnetic storage medium;
a head to detect magnetic domains on the medium;
a controller that controls a position of the head relative to the medium; and
a signal processor that interprets detected magnetic domains,
wherein the magnetic storage medium includes a substrate, an amorphous layer formed over the substrate, the amorphous layer comprising carbon and defining a thickness less than approximately 5 nanometers, a seed layer of platinum formed over the amorphous layer, and a multi-layered magnetic stack formed over the seed layer, wherein the multi-layered magnetic stack includes layers including platinum and layers including cobalt stacked in an alternating arrangement, wherein each of the layers of the multi-layered magnetic stack defines a thickness of less than or equal to approximately 3 nanometers.

27. The magnetic storage device of claim 26, wherein the device comprises a device selected from the group consisting of: a magnetic tape drive, a magnetic disk drive, a hard disk drive, a floppy disk drive, and a magnetic tape cartridge drive.

* * * * *